US010825623B1

(12) United States Patent
Tseng et al.

(10) Patent No.: US 10,825,623 B1
(45) Date of Patent: Nov. 3, 2020

(54) ROCKER ASSEMBLY STRUCTURE

(71) Applicant: Cheng Uei Precision Industry Co., Ltd., New Taipei (TW)

(72) Inventors: Chi Ming Tseng, New Taipei (TW); Tsung Shih Lee, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 16/697,529

(22) Filed: Nov. 27, 2019

(30) Foreign Application Priority Data

Sep. 6, 2019 (CN) .................. 2019 2 1485036 U

(51) Int. Cl.
*H01H 23/14* (2006.01)
*H01H 23/00* (2006.01)
(52) U.S. Cl.
CPC .......... *H01H 23/14* (2013.01); *H01H 23/006* (2013.01)
(58) Field of Classification Search
CPC ....... H01H 23/14; H01H 23/006; H01H 23/00
USPC ............. 200/293, 4, 6 A, 6 R, 339, 553–563
See application file for complete search history.

(56) References Cited

U.S. PATENT DOCUMENTS

| 5,504,286 A | * | 4/1996 | Tsai | ..................... G06F 3/0338 |
| | | | | 200/339 |
| 2015/0314193 A1 | * | 11/2015 | Lee | ........................ A63F 13/24 |
| | | | | 463/38 |

* cited by examiner

*Primary Examiner* — Nguyen Tran
*Assistant Examiner* — Iman Malakooti
(74) *Attorney, Agent, or Firm* — Lin & Associates Intellectual Property, Inc.

(57) ABSTRACT

A rocker assembly structure includes a pedestal having a base portion, and a keycap. A bottom wall of the accommodating groove protrudes upward to form a rod portion. Several portions of a peripheral surface of the rod portion are recessed inward to form a plurality of first guiding grooves. A lower portion of an inner wall of each first guiding groove is recessed inward to form a buckling slot. A front of the peripheral surface of the rod portion is further recessed inward to form a second guiding groove. The keycap covers the rod portion. Several portions of an inner wall of the keycap protrudes inward to form a plurality of buckling blocks. The plurality of the buckling blocks are disposed in the buckling slots of the plurality of the first guiding grooves and the second guiding groove.

6 Claims, 4 Drawing Sheets

ROCKER ASSEMBLY STRUCTURE

CROSS-REFERENCE TO RELATED APPLICATION

The present application is based on, and claims priority from, China Patent Application No. 201921485036.8, filed Sep. 6, 2019, the disclosure of which is hereby incorporated by reference herein in its entirety.

BACKGROUND OF THE INVENTION

1. Field of the Invention

The present invention generally relates to a rocker assembly structure, and more particularly to a rocker assembly structure of which an assembly procedure is simplified.

2. The Related Art

A conventional rocker assembly structure includes a pedestal and a keycap. The pedestal has a rod portion protruding upward. A bottom surface of the keycap is recessed to form an accommodating space. In assembly, after glue is dispensed in an inner wall of the keycap from a bottom of the accommodating space, the keycap is mounted around the rod portion, after the glue is solidified, so that the pedestal and the keycap are fixed with each other.

However, when the glue is dispensed manually, due to an instable amount of the glue, and chemical substances will be diffused into the air, thereby affecting a health condition of a person, if the glue is dispensed by a machine, a redundant cost will be expended, and a firm degree between the pedestal and the keycap is affected by solidified time.

Thus, it is essential to provide an innovative rocker assembly structure, so that an assembly procedure of the innovative rocker assembly structure is simplified, and a pedestal of the innovative rocker assembly structure is assembled firmly with a keycap of the innovative rocker assembly structure.

SUMMARY OF THE INVENTION

An object of the present invention is to provide a rocker assembly structure. The rocker assembly structure includes a pedestal having a base portion, and a keycap. A top surface of the base portion is recessed downward to form an accommodating groove. A middle portion of a bottom wall of the accommodating groove protrudes upward to form a rod portion. Several portions of a peripheral surface of the rod portion are recessed inward to form a plurality of first guiding grooves. A lower portion of an inner wall of each first guiding groove is recessed inward to form a buckling slot. A front of the peripheral surface of the rod portion is further recessed inward to form a second guiding groove. A bottom wall of the second guiding groove has a lower pressing surface slantwise extending downward and outward from top to bottom. The keycap covers the rod portion and is assembled in the accommodating groove. A bottom surface of the keycap is recessed upward to form an accommodating space. Several portions of an inner wall of the keycap protrudes inward to form a plurality of buckling blocks projecting into the accommodating space. The plurality of the buckling blocks are disposed corresponding to the buckling slots of the plurality of the first guiding grooves and the second guiding groove. A lower portion of a surface of each buckling block opposite to the inner wall of the keycap has an upper pressing surface slantwise extending downward and rearward from top to bottom, and the upper pressing surface of one buckling block is disposed corresponding to the lower pressing surface of the second guiding groove. The plurality of the buckling blocks are disposed in the buckling slots of the plurality of the first guiding grooves and the second guiding groove, and the upper pressing surface of the one buckling block covers the lower pressing surface of the second guiding groove.

Another object of the present invention is to provide a rocker assembly structure. The rocker assembly structure includes a pedestal having a base portion, a flexible printed circuit board and a keycap. The pedestal has a base portion. A top of the base portion protrudes upward to form a rod portion. Several portions of a peripheral surface of the rod portion are recessed inward to form a plurality of first guiding grooves. A lower portion of an inner wall of each first guiding groove is recessed inward to form a buckling slot. A front of the peripheral surface of the rod portion is further recessed inward to form a second guiding groove. A bottom wall of the second guiding groove has a lower pressing surface slantwise extending downward and outward from top to bottom. The flexible printed circuit board is mounted on a top face of the rod portion of the pedestal. The keycap covers the rod portion. A bottom surface of the keycap is recessed upward to form an accommodating space. Several portions of an inner wall of the keycap protrude inward to form a plurality of buckling blocks projecting into the accommodating space. A lower portion of a surface of each buckling block opposite to the inner wall of the keycap has an upper pressing surface slantwise extending downward and rearward from top to bottom. The plurality of the buckling blocks are disposed in the buckling slots of the plurality of the first guiding grooves and the second guiding groove, and the upper pressing surface of one buckling block covers the lower pressing surface of the second guiding groove.

Another object of the present invention is to provide a rocker assembly structure. The rocker assembly structure is mounted on a rocker component. The rocker component includes a rigid circuit board, and an electronic part mounted on the rigid circuit board. The electronic part protrudes upward to form a fixing rod. The rocker assembly structure includes a pedestal having a base portion, and a keycap. A top surface of the base portion is recessed downward to form an accommodating groove. A bottom wall of the accommodating groove protrudes upward to form a rod portion. Several portions of a peripheral surface of the rod portion are recessed inward to form a plurality of first guiding grooves. A lower portion of an inner wall of each first guiding groove is recessed inward to form a buckling slot. A front of the peripheral surface of the rod portion is further recessed inward to form a second guiding groove. A bottom wall of the second guiding groove has a lower pressing surface slantwise extending downward and outward from top to bottom. The pedestal has a fixing slot recessed upward from a bottom surface of the pedestal. The fixing rod is fixed in the fixing slot. The keycap covers the rod portion and is assembled in the accommodating groove. A bottom surface of the keycap is recessed upward to form an accommodating space. Several portions of an inner wall of the keycap protrude inward to form a plurality of buckling blocks projecting into the accommodating space. A lower portion of a surface of each buckling block opposite to the inner wall of the keycap has an upper pressing surface slantwise extending downward and rearward from top to bottom. The plurality of the buckling blocks are disposed in the buckling slots of the plurality of the first guiding grooves and the second guiding groove, and the upper pressing surface of the one buckling block covers the lower pressing surface of the second guiding groove.

As described above, the plurality of the buckling blocks of the rocker assembly structure are disposed in the plurality of the first guiding grooves and the second guiding groove, the buckling slot, the second guiding groove and the lower pressing surface, so that when the keycap is assembled with the pedestal of the rocker component, a material cost of dispensing the glue required in the prior art may be eliminated, and an assembly procedure of the rocker assembly structure is simplified, and the pedestal is assembled firmly with the keycap.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
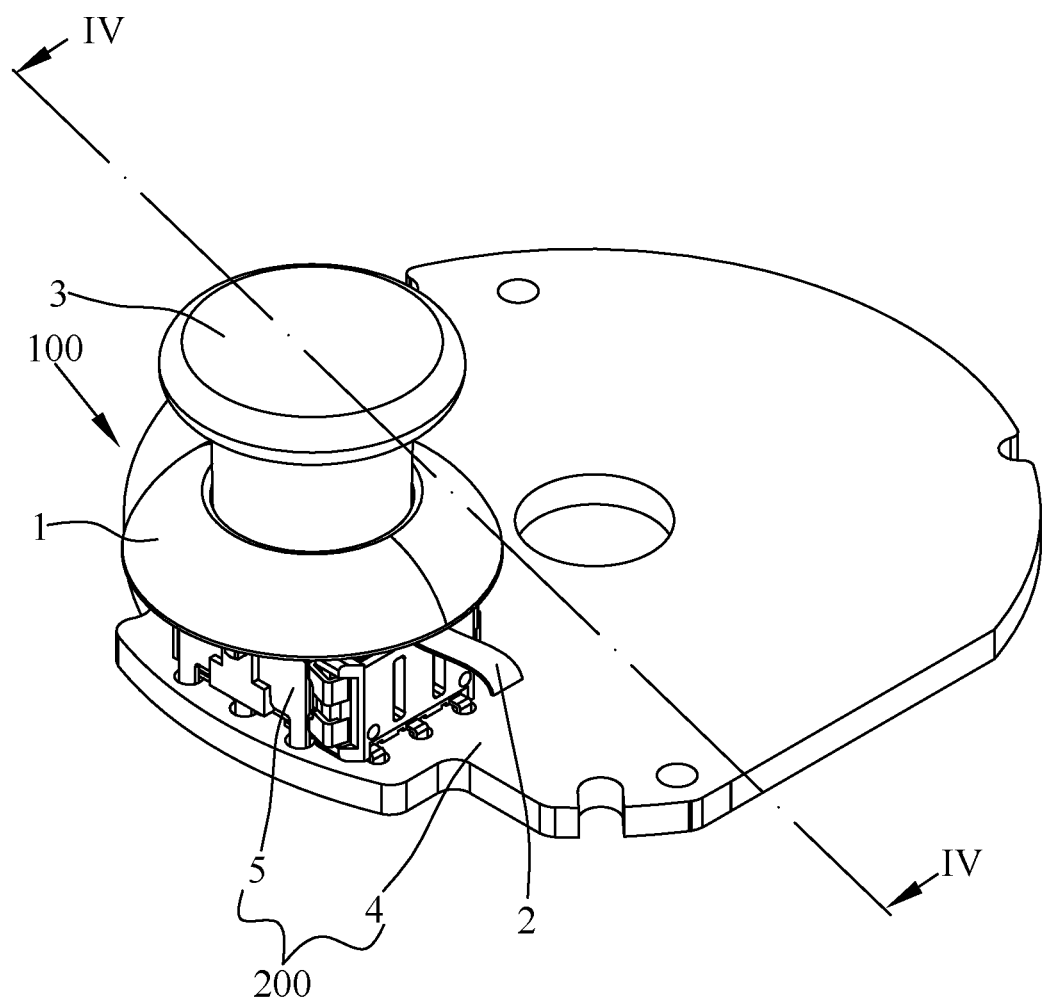
FIG. 1 is a perspective view showing that a rocker component of a rocker assembly structure is combined with an electronic component of the rocker assembly structure in accordance with a first embodiment of the present invention.
Figure 2:
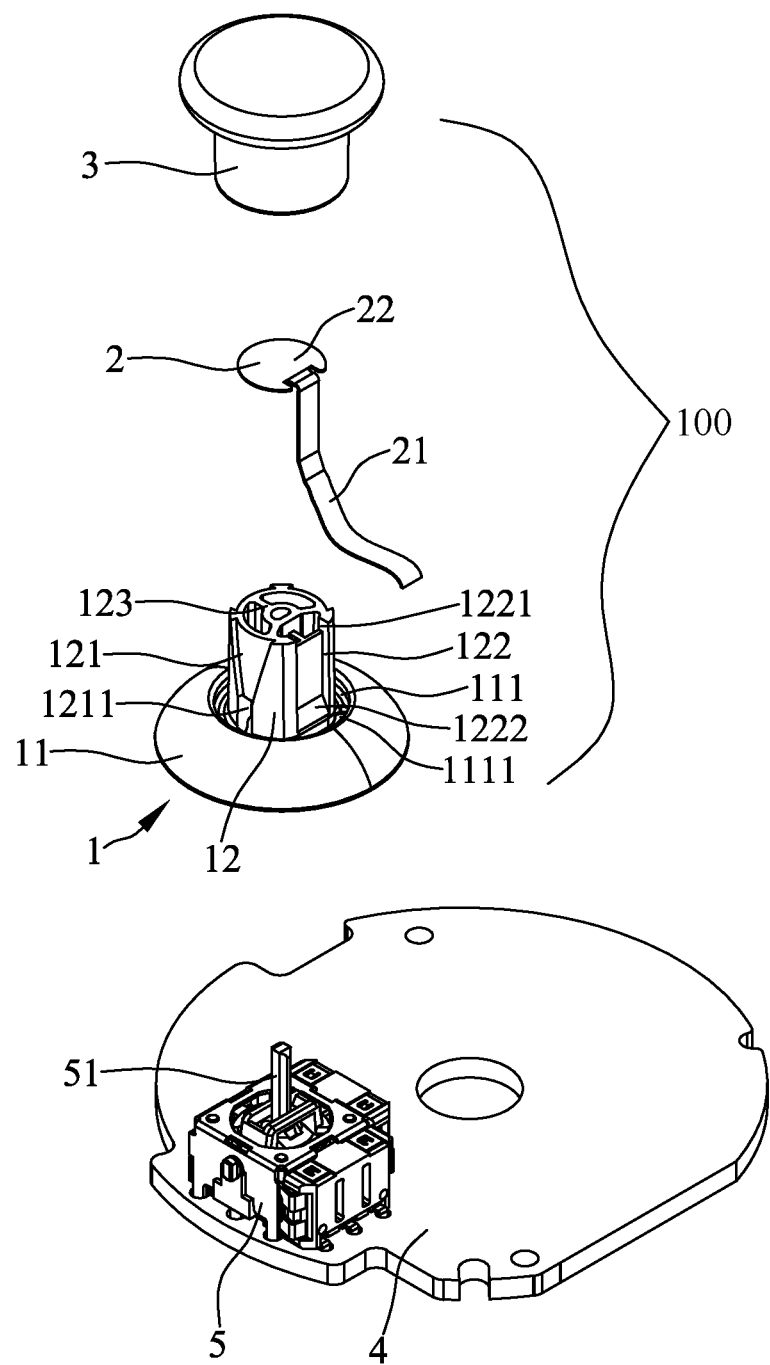
FIG. 2 is an exploded perspective view showing that the rocker component and the electronic component of the rocker assembly structure.

With reference to FIG. 1 and FIG. 2, a rocker assembly structure 100 in accordance with a preferred embodiment of the present invention is shown. The rocker assembly structure 100 is mounted on a rocker component 200. The rocker assembly structure 100 includes a pedestal 1, a flexible printed circuit board (FPC) 2 and a keycap 3.

Figure 3:
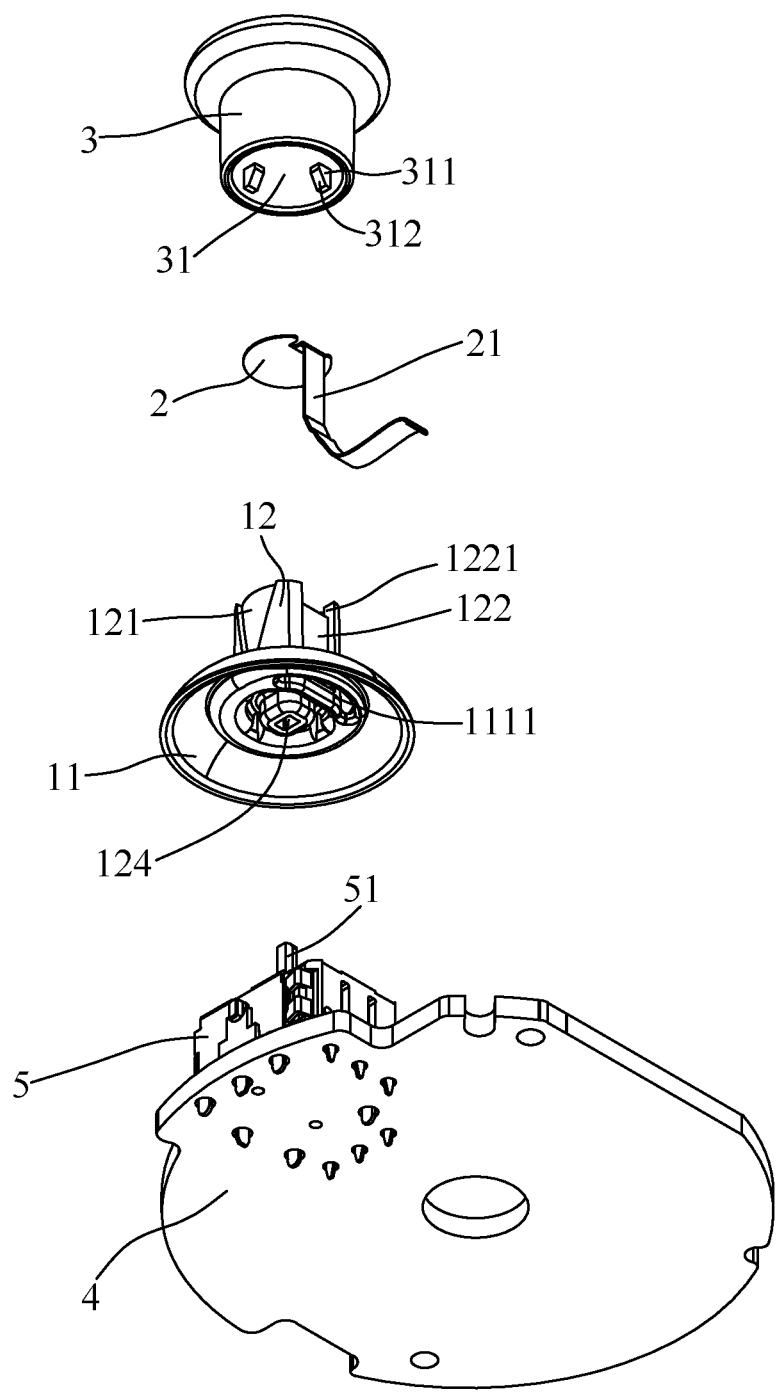
FIG. 3 is another exploded perspective view showing that the rocker component and the electronic component of the rocker assembly structure of FIG. 2.
Figure 4:
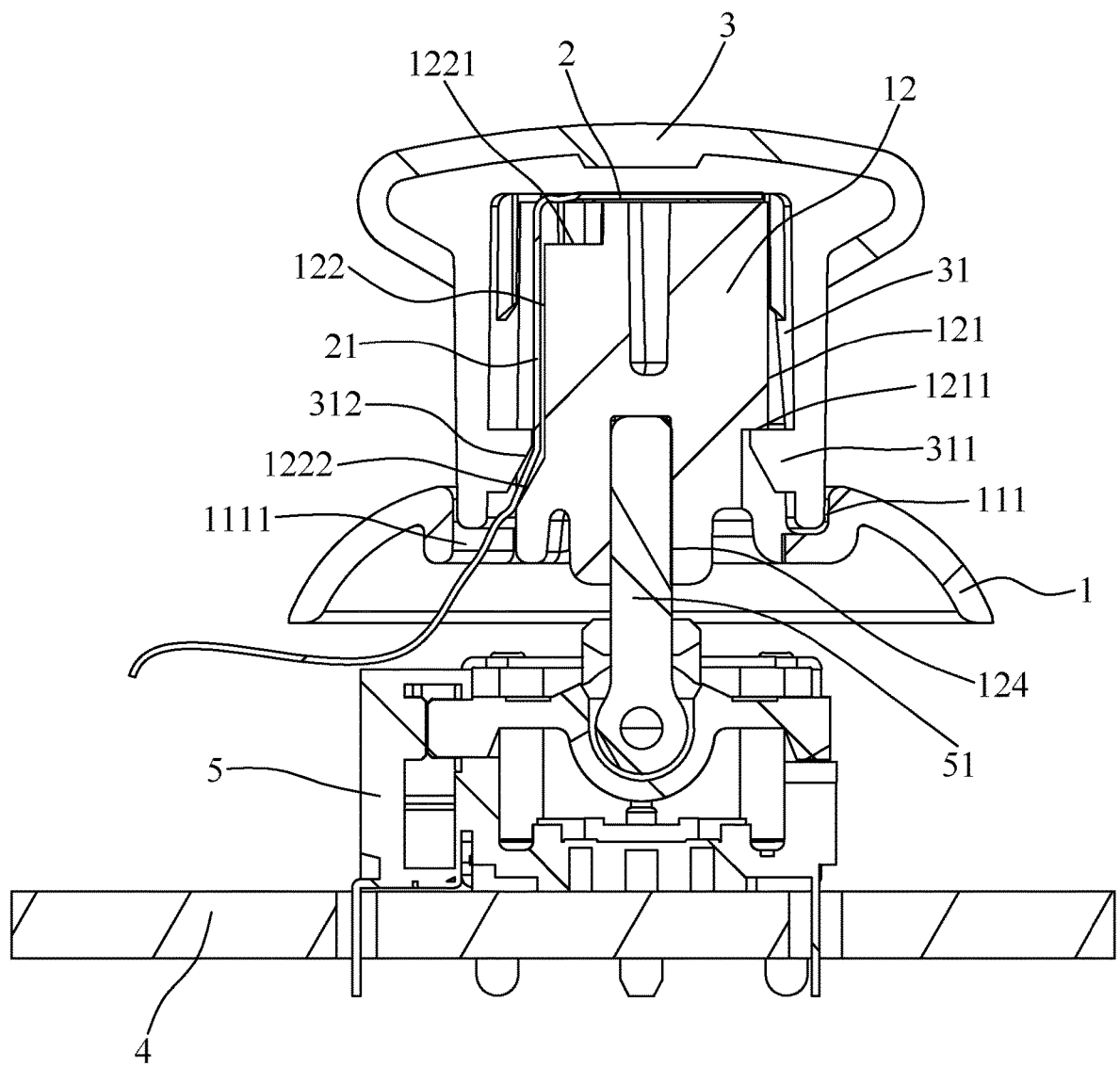
FIG. 4 is a cross-section view showing that the rocker component and the electronic component of the rocker assembly structure along a line IV-IV of FIG. 1.

With reference to FIG. 2 and FIG. 3, the pedestal 1 has a base portion 11. A middle of a top of the base portion 11 protrudes upward to form a rod portion 12. A top surface of the base portion 11 is recessed downward to form an accommodating groove 111. A middle portion of a bottom wall of the accommodating groove 111 protrudes upward to form the rod portion 12. An outer peripheral surface of the base portion 11 is gradually arched outward from top to bottom. Several portions of the peripheral surface of the rod portion 12 are recessed inward to form a plurality of first guiding grooves 121. Specifically, a top of each first guiding groove 121 is shown as an approximately inverted cone shape. A lower portion of an inner wall of each first guiding groove 121 is recessed inward to form a buckling slot 1211.

A front of the peripheral surface of the rod portion 12 is further recessed inward to form a second guiding groove 122. The second guiding groove 122 is disposed among the plurality of the first guiding grooves 121. A middle of a top portion of an inner wall of the second guiding groove 122 opens a notch 1221 recessed downward. A bottom wall of the second guiding groove 122 has a lower pressing surface 1222 slantwise extending downward and outward from top to bottom. In this preferred embodiment, the rod portion 12 has three first guiding grooves 121 and one lower second guiding groove 122. One side of a bottom wall of the accommodating groove 111 further opens an opening 1111 penetrating downward through the bottom wall of the accommodating groove 111. The opening 1111 is disposed below the second guiding groove 122. The rod portion 12 further has a horizontal top face 123.

With reference to FIG. 1 to FIG. 3, the flexible printed circuit board 2 is mounted on the top face 123 of the rod portion 12 of the pedestal 1. The flexible printed circuit board 2 has characteristics of a light weight, a thin thickness, and a bendability. The flexible printed circuit board 2 has a base plate 22, and a connecting portion 21 extended downward and then bent frontward from a front of the base plate 22. The connecting portion 21 passes through the notch 1221 to be mounted in the second guiding groove 122, and passes through the opening 1111 downward along the lower pressing surface 1222, so that the connecting portion 21 projects under the pedestal 1 and projects beyond the outer peripheral surface of the base portion 11 to connect other components.

With reference to FIG. 1 to FIG. 4, the keycap 3 covers the rod portion 12 and the flexible printed circuit board 2, and the keycap 3 is assembled in the accommodating groove 111. A middle of a bottom surface of the keycap 3 is recessed upward to form an accommodating space 31. Several portions of an inner wall of the keycap 3 protrude inward to form a plurality of buckling blocks 311 projecting into the accommodating space 31 of the keycap 3. The plurality of the buckling blocks 311 are disposed corresponding to and are disposed in the buckling slots 1211 of the plurality of the first guiding grooves 121 and the second guiding groove 122. A lower portion of a surface of each buckling block 311 opposite to the inner wall of the keycap 3 has an upper pressing surface 312 slantwise extending downward and rearward from top to bottom, and the upper pressing surface 312 of one buckling block 311 is disposed corresponding to the lower pressing surface 1222 of the second guiding groove 122. Each buckling block 311 is appropriate for being matched with one buckling slot 1211, and the upper pressing surface 312 of the one buckling block 311 covers the lower pressing surface 1222 of the second guiding groove 122.

With reference to FIG. 1 to FIG. 4, when the rocker assembly structure 100 is assembled, the flexible printed circuit board 2 is mounted on the top face 123. The connecting portion 21 of the flexible printed circuit board 2 is placed on the horizontal top face 123 and covers the lower pressing surface 1222, and the keycap 3 surrounds the top and the bottom of the rod portion 12 and is mounted in the accommodating groove 111. At the same time, the plurality of the buckling blocks 311 move downward along the plurality of the first guiding grooves 121 and the second guiding groove 122. Because the top of each first guiding groove 121 is shown as the approximately inverted cone shape, therefore, the plurality of the buckling blocks 311 gradually move downward toward a middle of the plurality of the first guiding grooves 121 and the second guiding groove 122, and are finally buckled in the plurality of the buckling slots 1211, so that the keycap 3 is fixed to the rod portion 12. At the same time, the rod portion 12 is accommodated in the accommodating space 31, one buckling block 311 is assembled in the second guiding groove 122, and the upper pressing surfaces 312 of the plurality of the buckling blocks 311 and the lower pressing surface 1222 clamp the connecting portion 21 of the flexible printed circuit board 2 to fix the flexible printed circuit board 2 between the rod portion 12 and the keycap 3. So that when the conventional rocker assembly structure is assembled, a material cost of dispensing glue is eliminated in prior art, and an assembly procedure of the rocker assembly structure 100 is simplified.

With reference to FIG. 1 to FIG. 4, the rocker assembly structure 100 is mounted on the rocker component 200. The rocker component 200 includes a rigid circuit board 4 and an electronic part 5. The electronic part 5 is mounted on the rigid circuit board 4. The electronic part 5 protrudes upward to form a fixing rod 51. The pedestal 1 further has a fixing slot 124 recessed upward from a middle of a bottom surface of the pedestal 1. The fixing rod 51 is fixed in the fixing slot 124. Therefore, the rocker assembly structure 100 is mounted on the rocker component 200.

When the user operates the rocker assembly structure 100, because the plurality of the buckling blocks 311 are buckled in the plurality of the first guiding grooves 121 and the second guiding groove 122, and a bottom of the keycap 3 is mounted in the accommodating groove 111. Therefore, the keycap 3 maintains in a fixed state and is without being loosened during an operation process of the user. And the connecting portion 21 of the flexible printed circuit board 2 is clamped by the lower pressing surface 1222 and the upper pressing surface 312. Therefore, when the user operates the rocker assembly structure 100, the connecting portion 21 of the flexible printed circuit board 2 moves along the lower pressing surface 1222 and the upper pressing surface 312 to prevent the connecting portion 21 of the flexible printed circuit board 2 arbitrarily moving on account of a movement of the rocker component 200 to generate a noise or a damage.

As described above, the plurality of the buckling blocks 311 of the rocker assembly structure 100 are disposed in the plurality of the first guiding grooves 121 and the second guiding groove 122, the buckling slot 1211, the second guiding groove 122 and the lower pressing surface 1222, so that when the keycap 3 is assembled with the pedestal 1 of the rocker component 200, a material cost of dispensing the glue required in the prior art may be eliminated, and the assembly procedure of the rocker assembly structure 100 is simplified, and the pedestal 1 is assembled firmly with the keycap 3.

What is claimed is:

1. A rocker assembly structure, comprising:
   a pedestal having a base portion, a top surface of the base portion being recessed downward to form an accommodating groove, a middle portion of a bottom wall of the accommodating groove protruding upward to form a rod portion, several portions of a peripheral surface of the rod portion being recessed inward to form a plurality of first guiding grooves, a lower portion of an inner wall of each first guiding groove being recessed inward to form a buckling slot, a front of the peripheral surface of the rod portion being further recessed inward to form a second guiding groove, a bottom wall of the second guiding groove having a lower pressing surface slantwise extending downward and outward from top to bottom; and
   a keycap covering the rod portion and being assembled in the accommodating groove, a bottom surface of the keycap being recessed upward to form an accommodating space, several portions of an inner wall of the keycap protruding inward to form a plurality of buckling blocks projecting into the accommodating space, the plurality of the buckling blocks being disposed corresponding to the buckling slots of the plurality of the first guiding grooves and the second guiding groove, a lower portion of a surface of each buckling block opposite to the inner wall of the keycap having an upper pressing surface slantwise extending downward and rearward from top to bottom, and the upper pressing surface of one buckling block being disposed corresponding to the lower pressing surface of the second guiding groove, the plurality of the buckling blocks being disposed in the buckling slots of the plurality of the first guiding grooves and the second guiding groove, and the upper pressing surface of the one buckling block covering the lower pressing surface of the second guiding groove.

2. The rocker assembly structure as claimed in claim 1, wherein a middle of a top portion of an inner wall of the second guiding groove opens a notch recessed downward, one side of a bottom wall of the accommodating groove further opens an opening penetrating downward through the bottom wall of the accommodating groove, the opening is disposed below the second guiding groove, the rocker assembly structure further includes a flexible printed circuit board, the flexible printed circuit board has a base plate, and a connecting portion extended downward and then bent frontward from a front of the base plate, the connecting portion passes through the notch to be mounted in the second guiding groove, and passes through the opening downward along the lower pressing surface.

3. The rocker assembly structure as claimed in claim 2, wherein the rod portion further has a top face, the flexible printed circuit board is mounted on the top face of the rod portion of the pedestal.

4. The rocker assembly structure as claimed in claim 1, wherein a top of each first guiding groove is shown as an approximately inverted cone shape.

5. A rocker assembly structure, comprising:
   a pedestal having a base portion, a top of the base portion protruding upward to form a rod portion, several portions of a peripheral surface of the rod portion being recessed inward to form a plurality of first guiding grooves, a lower portion of an inner wall of each first guiding groove being recessed inward to form a buckling slot, a front of the peripheral surface of the rod portion being further recessed inward to form a second guiding groove, a bottom wall of the second guiding groove having a lower pressing surface slantwise extending downward and outward from top to bottom;
   a flexible printed circuit board mounted on a top face of the rod portion of the pedestal; and
   a keycap covering the rod portion, a bottom surface of the keycap being recessed upward to form an accommodating space, several portions of an inner wall of the keycap protruding inward to form a plurality of buckling blocks projecting into the accommodating space, a lower portion of a surface of each buckling block opposite to the inner wall of the keycap having an upper pressing surface slantwise extending downward and rearward from top to bottom, the plurality of the buckling blocks being disposed in the buckling slots of the plurality of the first guiding grooves and the second guiding groove, and the upper pressing surface of one buckling block covering the lower pressing surface of the second guiding groove.

6. A rocker assembly structure mounted on a rocker component, the rocker component including a rigid circuit board, and an electronic part mounted on the rigid circuit board, the electronic part protruding upward to form a fixing rod, comprising:
   a pedestal having a base portion, a top surface of the base portion being recessed downward to form an accommodating groove, a bottom wall of the accommodating groove protruding upward to form a rod portion, several portions of a peripheral surface of the rod portion being recessed inward to form a plurality of first guiding grooves, a lower portion of an inner wall of each first guiding groove being recessed inward to form a buckling slot, a front of the peripheral surface of the rod portion being further recessed inward to form a second guiding groove, a bottom wall of the second guiding groove having a lower pressing surface slantwise extending downward and outward from top to bottom, the pedestal having a fixing slot recessed upward from a bottom surface of the pedestal, the fixing rod being fixed in the fixing slot; and a keycap covering the rod portion and being assembled in the accommodating groove, a bottom surface of the keycap being recessed upward to form an accommodating space, several portions of an inner wall of the keycap protruding inward to form a plurality of buckling blocks projecting into the accommodating space, a lower portion of a surface of each buckling block opposite to the inner wall of the keycap having an upper pressing surface slantwise extending downward and rearward from top to bottom, the plurality of the buckling blocks being disposed in the buckling slots of the plurality of the first guiding grooves and the second guiding groove, and the upper pressing surface of the one buckling block covering the lower pressing surface of the second guiding groove.

* * * * *